Aug. 7, 1945. J. B. WILKIE 2,381,414
MEASURING INSTRUMENT
Filed Jan. 16, 1943
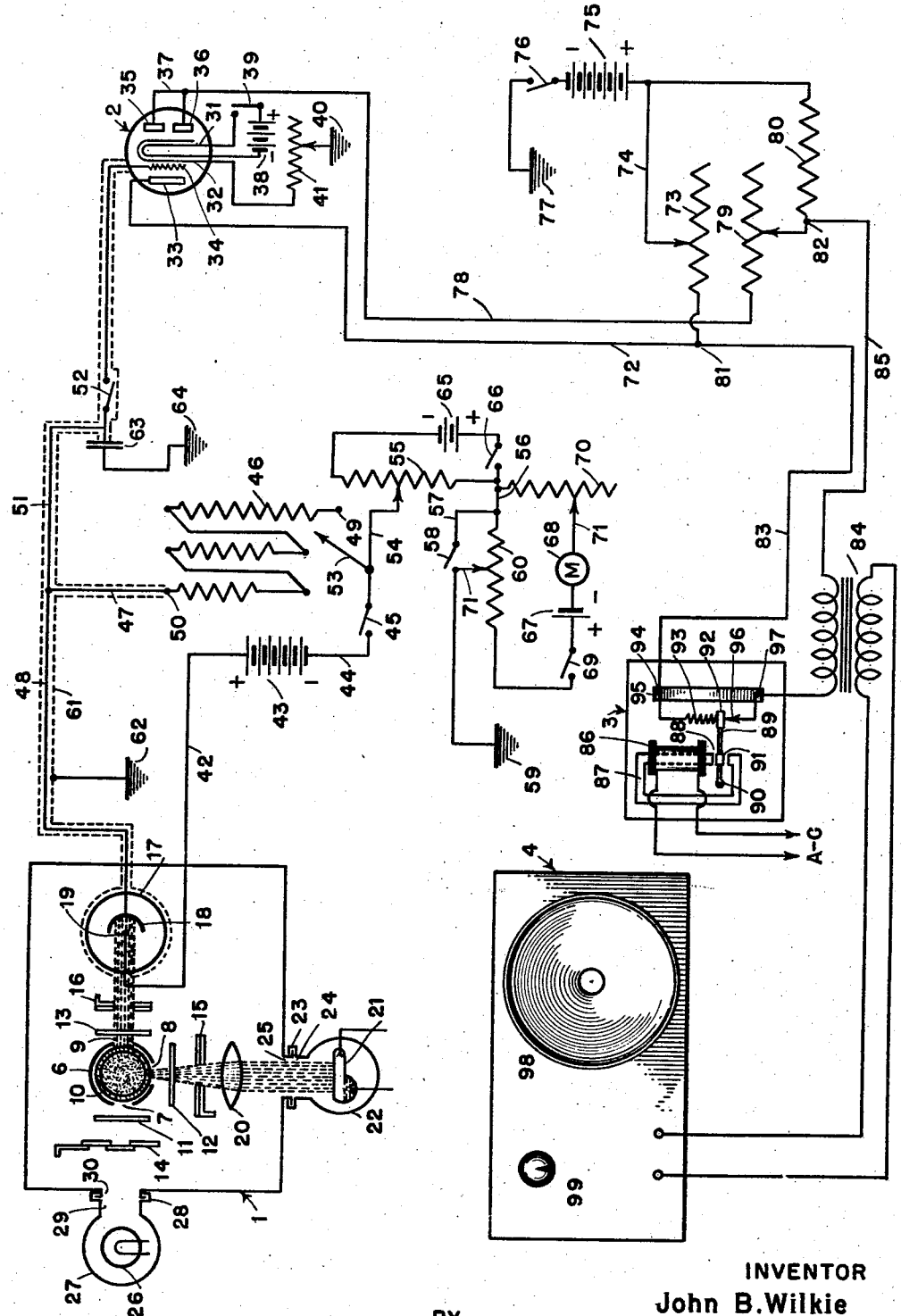
INVENTOR
John B. Wilkie
BY
ATTORNEYS Patented Aug. 7, 1945

2,381,414

UNITED STATES PATENT OFFICE 2,381,414

MEASURING INSTRUMENT

John B. Wilkie, Silver Spring, Md.; dedicated to the free use of the People in the territory of the United States Application January 16, 1943, Serial No. 472,595

9 Claims. (Cl. 250—41.5)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

This invention relates to measuring instruments, particularly to means for measuring the intensity of light transmitted through a non-fluorescent or emitted from a fluorescent fluid solution to determine its concentration for purposes well-known in the art of chemistry, such, for example, as to determine the vitamin A, potency of carotene.

In instruments of this kind the photoelectric cell is frequently employed as the light sensitive device. This requires means for measuring the very small differential of current obtained from the cell when light is transmitted through or emitted from a solution of unknown concentration onto the plate of the cell as compared to that obtained using a known or reference standard solution.

A simple system, consisting of a sensitive galvanometer connected directly to the cell, may be used for this purpose in most instances. However, the delicateness of the required galvanometer and the tedious precautions necessary in its use are substantial deterrents to its employment.

Numerous other systems, essentially all of which utilize either direct, or alternating or pulsating current electronic amplifiers, have been tried. The ordinary direct current amplifier has an electronic tube, the grid voltage of which is controlled by a photoelectric cell and the output of which is usually connected in a balancing fashion to a galvanometer. This system is limited in its sensitivity to the sensitivity of the galvanometer employed. Although a more rugged galvanometer may be used than with the simple system described above, the system is then not sufficiently sensitive whenever by necessity resulting low light intensities are encountered.

Multiple stage direct current amplifiers and regenerative amplifiers which use relatively rugged meters in their output circuits are also known. However, the vagaries of operation due to stray currents which enter into the early stages are increased and troublesome regenerations may ensure with the multiple stages, making the obtainment of accurate measurements very difficult.

Alternating or pulsating current amplifiers using any number of stages are, on the other hand, quite stable. Their employment, however, requires the use of means for converting the continuous light impinging on the plate of a photoelectric cell into alternating or pulsating current responses. Heretofore, one manner of accomplishing this has been by means of a light chopper of the rotating blade or vibrating reed type interposed in the path of the light. Such choppers are cumbersome and inconvenient to use and they limit the use of the amplifier to the measurement of light intensities. Another manner of converting the continuous output from the light source to an alternating current response has been by means of a rotating commutator or vibrating contact type modulator connected in series with the circuit of the photoelectric cell. Modulators may be so used if the sensitivity requirements are not too great. However, they introduce complicating currents into the most sensitive circuit of the amplifier and, if measurements of very weak or small differentials in current are required, systems using modulators in this manner are, therefore, not suitable.

This invention substantially eliminates the defects of the prior art enumerated above, and has among its objects the provision of a precision instrument for measuring the concentration of a solution and which is sensitive and stable in its operation; the provision of an instrument which is simple to manipulate; the provision of an instrument which can be used for measuring concentrations with solutions which are either fluorescent or colored; the provision of improvements in photometers; the provision of an electronic amplifying system suitable for measuring very weak or very small differentials of direct current; and such other objects as will be apparent from the following detailed description, appended claims and annexed drawing.

The invention, illustrated diagrammatically in a single figure, comprises, in general, a photometer head 1, which functions to convert a light beam received from or through the sample into a direct current; a suitable electronic device, such as a tube 2, having its input connected by a suitable circuit with the output from the photometer head and having two output circuits which may be balanced by suitable adjustment; a modulator 3 connected in shunt with the balanced output circuits of the tube for converting the direct current resulting from unbalancing of the output circuits into pulsating current; and an alternating or pulsating current amplifier 4 coupled with the pulsating current circuit of the modulator to indicate flow of current therein.

The photometer head 1 is so constructed that either ordinary light, such as that derived from a light bulb, may be filtered and passed directly through the sample and into the photoelectric cell, or ultraviolet light, such as that derived from a mercury tube, may be passed through the sample, or it may be impinged on the sample to cause fluorescence, and the light emitted from the fluorescent sample passed into the cell.

In particular, the photometer head is provided with a cylindrical-shaped tube holder 6 having an opaque wall with windows 7, 8 and 9 provided therein. A sample holding tube 10, which may be in the form of a test tube having a clear glass wall, fits inside the tube holder 6 in such manner that it is in line with the windows. Light filters 11, 12 and 13 are positioned in front of the windows and are removable to provide for the selection of filters to screen out any undesired light frequencies. Shutters 14, 15 and 16 are provided adjacent to the filters 11, 12 and 13, respectively. A photoelectric cell 17, having a light-sensitive plate or cathode 18 and an anode 19, is so positioned that light received from the window 9 and through the filter 13 and shutter 16 will fall on the cathode. A light-converging lens 20 is located in front of shutter 15. A mercury-arc tube 21 is located inside a container 22. The container is detachably coupled to the wall of the photometer head by any desired means, such as a sliding tongue and groove joint 23, in such manner that the ultraviolet light received from the tube passes through suitable openings 24 and 25 in the walls of the container and the photometer head, respectively, thence through the lens 20, shutter 15, filter 12, window 8, and into the sample contained in the tube. Another source of ordinary light, such as an automobile headlight bulb 26, is located inside a container 27. This container is detachably coupled to the wall of the photometer head by a joint 28 corresponding to the joint 23, in such manner that the light received from the bulb can pass through suitable openings 29 and 30 in the walls of the container and photometer head, respectively, thence through the shutter 14, filter 11, window 7, sample holding tube 10, window 9, filter 13, shutter 16, and into the photoelectric cell.

In case a fluorescent sample is tested, the photometer head is used in the manner indicated in the drawing, that is, with container 22 coupled to joint 23, light following the path indicated in dotted lines. Only the light emitted from the sample is passed into the photoelectric cell. In the case of testing a non-fluorescent colored sample, the mercury-arc tube is blacked out and light from bulb 26 may be used, or if desired, container 22 may be placed in the position of container 27, the isolated mercury lines thereby providing essentially monochromatic light which simplifies filtering problems and may be necessary in testing a sample having a narrow absorption band, including the mercury line, and when straight line concentration-density measurements are desired. Use of the headlight bulb has the advantage, however, of continuity and constancy of light. It may be lighted with a battery while the mercury arc is lighted with alternating current resulting in pulsating light emittance.

Using light of restricted wave lengths, which is obtained by the proper selection of filters 11, 12 and 13, is desirable. In case of testing a fluorescent sample with tube 21 in the position shown, only ultraviolet, or wave bands that cause fluorescence, are employed. If other frequencies are present, reflections will result in light reaching the photoelectric cell other than that emitted by the solute. Likewise, in testing a colored sample, only light frequencies within the range of absorptive spectra of the sample should be employed. With the proper selection of filters, a straight line functional relationship or proportionality exists between the amount of light reaching the photoelectric cell and the concentration of a fluorescent sample, and between the amount of light reaching the photoelectric cell and the transmittancy of a colored sample. In the latter case, the functional relationship between the transmittancy and concentration, although not a proportionality, is known and the concentration can be determined in reference to the transmittancy by a simple computation or by reference to a curve. Also, the relationship of the quantity of electrons emitted from the plate of the photoelectric cell and the intensity of light received thereon is that of a straight line. Thus, by using properly restricted light frequencies, the current of the photoelectric cell has a straight line relationship to the concentration or the transmittancy of the sample, which results, as will be explained later, in an instrument which is very simple to calibrate and use.

The balance of the device comprises an instrument for measuring the differentials in current flow from the output of the photoelectric cell.

The electronic tube 2 is a duplex-diode triode of a known design, comprising a heater 31, cathode 32, triode plate 33, grid 34 for controlling plate 33 and diode-plates 35 and 36 not controlled by the grid. The cathode, triode plate and grid function as any electronic device having at least these three elements, such as a triode. The cathode and two diode plates function as an electronic device having at least these two elements, such as a diode, since the plates 35 and 36 are connected in any desired manner, such as by a jumper 37 which may bridge the proper contacts of the tube socket. The terms "triode" and "diode," as herein used, are not exclusive of electronic devices having more than three and two elements, respectively.

Heater 31 is heated in a conventional manner, such as by a battery 38 connected thereto through a filament switch 39. The cathode is connected to a ground 40 through a variable resistance 41, the purpose of which will be explained later.

The input for supplying the varying voltage to the grid of the triode is coupled with the circuit of the photoelectric cell which may be thought of as the incident circuit having differentials of current flow. Electrons leaving photoelectric cell cathode 18 are received on the anode 19 and pass through conductor 42, photoelectric cell battery 43, conductor 44, photoelectric cell switch 45, variable tap high resistance 46, conductors 47 and 48, back to cathode 18. The electric flow results in a difference of potential between the selected terminal tap, such as that shown at 49, and terminal 50 of the resistance. Terminal 50 is also connected to the triode grid 34 through conductors 47 and 51 and the grid switch 52, while the selected terminal tap of resistance 46 is connected to the tube cathode 32 through the variable tap arm 53, conductor 54, one branch of voltage divider 55, conductor 56, thence either through conductor 57 and switch 58 directly to ground 59, or through one branch of the voltage divider 60 and to the ground depending on the setting of the switch, and through ground 40 and resistance 41.

Thus, as the current from the photoelectric cell varies due to changes in the intensity in the light impinged on its plate, the IR drop across the high resistance 46 also varies. With increase in light intensity, the potential of the grid 34 is swung in the positive direction.

The entire circuit leading from the photoelectric cell cathode to the tube grid and also the photoelectric cell itself are enclosed in a shield 61 grounded at 62. Because this part of the circuit is very sensitive, it requires careful shielding. Any stray pulsating voltage reaching the grid will cause response in the amplifier, interfering with proper functioning of the instrument. The grid circuit must also be securely insulated to prevent leakage which would interfere with the sensitivity and stability. A stray pulsating grid voltage, as will later be explained, will cause unwanted response in the amplifier, and grid impressed constant voltage, derived from stray currents, will also cause such response.

A by-pass condenser 63 is connected between this part of the circuit and ground 64. The necessity for this condenser follows from the use of alternating current for lighting the mercury-arc tube 21 which results in a corresponding pulsating current in the photoelectric cell circuit. The condenser 63 becomes charged and by choosing a condenser of sufficiently large capacity the pulsating component or variation in electronic flow in the photoelectric cell circuit can be made negligible compared to the charge on the condenser, and therefore only the direct component materially affects the grid. On the other hand, a condenser of too large capacity cannot be chosen. The condenser receives its charge through the photoelectric cell, building up slowly, due to the very small current which flows through the cell. Therefore, if it has a very large capacity the time element required to charge it becomes detrimental in using the instrument.

In order for tube 2 to function properly, its grid 34 must be provided with a suitable negative bias. Alternate means, which may be used independently or used together, are provided for adjusting the grid bias.

The first means comprises variable resistance 41. All incoming electronic flow to the cathode 32 is received from the ground 40 and through the resistance 41. The adjustable negative bias of the grid is provided by virtue of the IR drop across the variable resistance 41. If this means is not used resistance 41 may be thrown out by adjustment to its zero position.

The second means is provided by a biasing circuit having a C-battery 65, connected in parallel through C-battery switch 66 with a variable voltage divider 55. The positive side of the voltage divider is connected to ground 59 and, therefore, to the tube cathode through circuits already described. The variable negative end is connected to the tube grid through the arm of voltage divider 55, resistance 46, and so forth, completing circuits already described. Negative bias is added to the grid by adjusting the arm of divider 55 towards the negative end of its resistance.

In making a test, the concentration of the unknown sample is determined by comparing its fluorescence, in case of a fluorescent sample, or its light transmittancy, in case of a colored sample, to that of a reference standard fluorescent solution or a clear solution or blank, respectively. Assuming that the reference standard fluorescent solution has been placed in the sample holding tube 10 and light received from it into the photoelectric cell, the grid of tube 2 will have a certain potential. If a sample of lower concentration, and consequently of lesser fluorescence, is now placed in the sample holding tube in lieu of the reference standard, the grid will swing toward the negative.

Means is provided through the meter battery 67 and meter 68 to compensate for the change in the grid potential due to the change in light intensity received in the photoelectric cell. In this compensating circuit the positive side of the battery 67 is connected through meter switch 69, the resistance element of variable voltage divider 60, variable resistance 70, meter 68 and back to the negative side of the battery. The negative terminal of the voltage divider 60 connects through conductor 56, one branch of voltage divider 55, to the tube grid by a previously described circuit, and the variable positive terminal is connected directly to ground 59. Thus, with variable resistance 70 fixed, voltage divider arm 71 may be adjusted until the swing of grid 34 toward the negative, due to decreased light received in the photoelectric cell, is exactly compensated for by decreasing the negative voltage derived from the compensating circuit. The variable voltage divider 60 may be calibrated and the percentage concentration of the unknown sample read directly on it.

An alternate, and also preferred, means for varying the compensating voltage is provided by the variable resistance 70. If voltage divider 60 is fixed, varying resistance 70 will vary the current in the compensating circuit and will thereby vary the IR drop across the branch of the voltage divider 60 connected between ground 59 and conductor 56, which may be thought of as a compensating circuit resistance, decreasing the negative voltage applied to the grid 34 as the resistance 70 is increased. At the same time, the reading of meter 68 drops. Assume the instrument has been set by adjusting the voltage divider 60 to give a reading of 100 on meter 68 when the photoelectric cell receives light from the reference standard solution. The reading on the meter, when the sample replaces the reference standard and resistance 70 has been increased to exactly compensate for the change of voltage on grid 34, will then read directly the percentage relationship between the concentration of the sample and that of the reference standard.

In case of testing a colored sample, the procedure is substantially the same, except that a blank or clear solvent is used as the reference standard material and the instrument is set to give a reading such as 100 on the meter with such blank.

Tracing the triode output circuit of tube 2, electrons flow from ground 40 onto cathode 32 to triode plate 33, through conductor 72, variable triode plate resistance 73, conductor 74, plate voltage supply, such as a B-battery 75, and B-battery switch 76 back to ground 77.

A balancing circuit is provided by the diode output circuit. Electrons flow from ground 40 to the diode plates 35 and 36, thence through conductor 78, variable diode plate resistance 79, fixed resistance 80, battery 75, and switch 76 back to the ground 77. For any particular voltage on grid 34 and resultant flow of current through the plate circuit, resistances 73 and 79 can be so set that a flow through the balancing circuit is such that the same potential exists at the terminal points 81 and 82. This balancing of potential results in a null current flow through the detection circuit, comprising conductor 83, modulator 3, the primary of transformer 84 and conductor 85.

Means for modulating a current of the detection circuit is provided by modulator 3 which is of the vibrating contact type. It comprises an electromagnet 86, the core 87 of which is provided with an air gap 88. A vibrating contact arm 89 is pivoted at 90 and carries a magnetic material actuator 91 located in the air gap. Movable insulated contact 92 carried on the free end of arm 89 is connected by a flexible conductor 93 to a binding post 94, to which conductor 83 is also attached. The binding post 94 is supported on a terminal strip 95 of insulating material. Fixed contact 96 is connected to the primary side of transformer 84 through binding post 97, as illustrated. The winding of electromagnet 86 is connected to any suitable alternating current source, indicated as A-C in the drawing, and whatever frequency it imparts to the vibrating contact arm will be imparted to any current flowing in the transformer 84.

Means for detecting current flow in transformer 84 is provided by the alternating current amplifier 4. The amplifier may be of conventional design, as long as it amplifies the frequency imparted to it by the modulator. The output of amplifier 4 is connected to an indicator, which is in the embodiment therein disclosed both a loud speaker 98 and/or an indicating electron-ray tube 99, through a suitable switching or plug-in arrangement (not shown). Thus, an audible and a visual indication, separately or together of the presence of current flowing in the detection circuit is given.

Assume a certain potential on grid 34 and an adjustment of resistances 73 and 79 giving a balance of potential at points 81 and 82. No current will flow in the detection circuit. If the potential of grid 34 is now changed, even by a very minute amount, the current flowing in the triode output circuit will change, and the potential between points 81 and 82 will be thrown out of balance. As a result, at least a part of the triode output current will flow through the detection circuit which, when amplified, is easily detected. The instrument is, accordingly, very sensitive to minute changes in the current of the photoelectric cell circuit.

Tube 2 operates best in this circuit when the grid is maintained at a bias close to its floating grid potential, that is, the potential which it would attain due to internal electronic and ionic equilibrium conditions, if no measures were taken to provide an external bias. Such potential will be obtained by the grid if the tube is placed in operation and the grid is disconnected from any part of the circuit. This is the grid potential at which there is a minimum of leakage currents onto or from the grid, since it is the natural potential at which the grid tends to remain. Therefore, the instrument is most stable in its operation when the tube operates with its grid at or near this potential.

By way of explaining the manner of using the instrument, assume fluorescent samples are to be tested. The instrument is first warmed up by throwing in all circuits allowing a sufficient warm-up interval to prevent drift. A known reference standard, having more fluorescence than any sample to be tested, is placed in position in the photometer head and tube 21 is lighted. Shutter 15 is ordinarily left open, but it may be partially closed to decrease the light intensity or fully closed to protect the standard solution while making preliminary adjustments.

In making preliminary adjustments, shutter 16 is closed to prevent all light from reaching the photoelectric cell. Switch 58 is also closed. With grid switch 52 open, resistances 73 and 79 are manipulated until points 81 and 82 are in exact balance as determined by the closing of the angle of tube 99 and/or by the absence of hum in the loud speaker. This is the setting with the grid 34 operating at its floating grid potential and with balance in the two output circuits of the tube.

Assume that C-battery 65 is to be used for maintaining the grid bias, with resistance 41 at a fixed setting, such as at zero. Switch 52 is closed and, without disturbing the setting of resistances 73 and 79, voltage divider 55 is adjusted until the negative bias supplied by C-battery 65 is the same as the floating grid potential. This bias point is determined simply by moving the contact arm of voltage divider 55 until the amplifier again indicates null current in the detection circuit. The adjustment of the grid potential need not be further disturbed. It is not very critical and it maintains its constancy well. Switch 58 is now opened and the instrument is ready to begin taking measurements. Of course, if desired, the grid can be set on any other predetermined potential by making the manipulations of resistances 73 and 79, mentioned above, with a predetermined potential applied to the grid independently of all parts of the circuit rather than with the floating grid potential. This may be accomplished by inserting the predetermined potential across the grid and cathode with the grid disconnected from the other parts of the circuit.

With the reference standard solution still in place, shutter 16 is opened wide. If meter 68 is to be read rather than the calibration on the voltage divider 60, resistance 70 is next adjusted to give a reading of 100 on meter 68. The swing of grid 34 toward the positive, due to the light emitted from the solution, causes an unbalance of potential at points 81 and 82. This results in an indication of current in the amplifier and is compensated for by adjusting the voltage divider 60 until null current in the detection circuit is again attained.

At this point it may be well to check the instrument for drift. This is readily done by closing shutter 16 and switch 52, thus throwing grid 34 onto the potential maintained by the C-battery. If there has been drift, it is detected by current in the amplifier and is eliminated by readjustment of either or both of resistances 73 and 79. Switch 58 is then opened.

The reference standard solution is then replaced by a sample to be tested and light emitted from it is permitted to enter the photoelectric cell. Due to the lesser light intensity of the sample, the grid 34 is thrown toward the negative resulting in an unbalancing of the null current as detected by the amplifier. The swing of the grid toward the negative is then offset by adjusting the resistance 70 until null current in the detection circuit is again attained. In this adjustment the resistance of 70 will be necessarily increased, due to the polarity of battery 69 and current flowing in meter 68 will be decreased. Due to the straight-line relationship before explained and to the fact that meter 68 was set to read 100 with the standard solution, the meter will read a figure which is the percent concentration of the sample relative to the fluorescent reference standard.

Testing of a colored sample is accomplished in substantially the same way, except that the reference standard will be a clear, uncolored solvent or a blank and light will be received from bulb 26 or from mercury-arc tube 21 positioned in place of bulb 26. In this case meter 68 will record a figure which is the percent transmittancy of the sample relating to the standard, from which the concentration may be calculated by a simple formula or by reference to a curve. Of course, the meter can be calibrated to read concentration directly.

The instrument, including the photoelectric cell and circuits associated therewith, is a photometer and has utility in measurements of intensity of very weak and very small differentials of light falling on the plate of the cell. It will be obvious that the meter 68 is easily calibrated to read directly the light intensities in any desired units.

Excluding the photoelectric cell and considering its circuit as any primary circuit having a direct current flow, the photometer becomes an instrument suitable for measuring very weak or very small differentials of direct current in the primary circuit to determine the amperage or voltage of the current.

Although the values of most of the elements used in the circuits of this instrument are not very critical, certain of them will be indicated.

Using a standard photoelectric cell 19, R. C. A. 926, it may be supplied with a battery 43 of 22 volts, although a wide range of voltage can be used. Resistance 46 may range from 20 megohms to 3500 megohms, with as many taps as desired. The lower resistances will usually require the shorter range tappings. For light sources, an ordinary 32 candle power headlight bulb is satisfactory at 26, and mercury arc tube 21 may be an H-4 G. E. lamp.

Tube 2 is a conventionally known type No. 85. With 22 volts on B-battery 75 and a resistance of 20,000 ohms at 80, resistances 73 and 79 may have maximum values of 20,000 ohms and 200,000 ohms, respectively. These values are, of course, subject to wide variation. The plate circuits of a tube of the kind used can be supplied with as little as 5 volts, and the tube has a recommended supply of 250 volts maximum for the triode plate. Resistance 41 may have a maximum of 2,000 ohms. Using a C-battery 65 of 3 volts, the overall resistance of voltage divider 55 may vary within very wide limits, although it should be high enough to prevent undue drain on the battery. A resistance of 500,000 ohms is satisfactory.

Using a 0–1.0 milliammeter at 68, a battery at 67 having one and one-half volts is sufficient. With this voltage the overall resistance of voltage divider 69 is preferably about 1100 ohms, but it may range from 100 ohms to 1300 ohms. The resistance 70 may have a maximum value of 1 megohm.

The capacity of condenser 63 is subject to a fairly wide range, but it does have a critical value for reasons already stated. Values of .001 mfd. to .006 mfd. are about the limit of range and a value of .002 mfd. is quite satisfactory when the values of the other units affecting it are substantially those heretofore indicated.

Although the disclosure of the instrument has been set forth in specific details, it is not intended to limit the invention thereto, except as may be required by the appended claims.

Having thus described my invention, what I claim is:

1. An instrument for measuring the concentration of a fluid comprising means for producing a direct current flow which has a known functional relationship to variations in concentrations of fluids tested, a triode, an input circuit for applying a potential to the grid of the triode in response to the current flow, a compensating circuit for applying a potential to the grid to compensate for that applied due to the current flow, said compensating circuit including a direct current meter, the readings of which have a straight line functional relationship to the current flow, a triode output circuit having a plate voltage supply, a balancing circuit which may be varied to establish points of equal potential between a point in the balancing circuit and a point between the plate of the triode and its voltage supply, a current detection circuit connected in shunt with the points of equal potential and having a means for modulating any current flowing in the detection circuit, and a pulsating current amplifier coupled with the current detection circuit and having means for indicating current flowing therein.

2. An instrument for measuring the concentration of a fluid comprising: a photometer head having a photoelectric cell, an ultraviolet ray light source for causing fluorescence of a fluorescent sample to be tested, means providing for positioning the sample in the path of the ray and permitting light emitted from the sample to control the electronic emission of the photoelectric cell, an ordinary ray light source so positioned that light from it may be passed through a colored sample to be tested to control the electronic emission of the photoelectric cell, the ultraviolet ray source being adapted to be positioned in place of the ordinary light ray source, and selective light filters so positioned that the source of light may be filtered to give predetermined light wave bands; an electronic diode triode tube; an input circuit for controlling the potential of the grid of the triode in response to the output of the photoelectric cell and having a battery connected in series with a high resistance and the photoelectric cell, one terminal of the high resistance being connected to the grid of the triode; a compensating circuit for applying a potential to the grid to compensate for that applied due to current flowing through the photoelectric cell and having a voltage divider, a battery, a direct current meter, and a variable resistance, all connected in series with the resistance of the voltage divider, the arm of the voltage divider being connected to the cathode of the triode, and one terminal of the voltage divider being connected to the other terminal of the high resistance of the triode input circuit, whereby adjustment of the variable resistance can be made to compensate for the output of the photoelectric cell and the resulting current can be read on the meter; a triode output circuit having a variable triode plate resistance and a B-battery connected in series; a balancing circuit having a variable diode plate resistance and a B-battery connected in series; a current detection circuit having a modulator, one terminal of which is connected to the triode plate and the other of which is connected to the arm of the variable diode plate resistance, for modulating any current flowing in the current detection circuit due to a difference of potential between the points of connection; and a pulsating current amplifier coupled with the current detection circuit and having an indicator for indicating current flow in the detection circuit.

3. A photometer comprising a photoelectric cell, a photoelectric cell circuit, a triode, an input circuit for applying a potential to the grid of the triode in response to current flow in the photoelectric cell circuit, a compensating circuit for applying a potential to the grid to compensate for that due to the current flow, said compensating circuit including a direct current meter, a triode output circuit having a plate voltage supply, a balancing circuit which may be varied to establish points of equal potential between a point in the balancing circuit and a point between the plate of the triode and its voltage supply, a current detection circuit connected in shunt with the points of equal potential and having means for modulating any current flowing in the detection circuit, and a pulsating current amplifier coupled with the current detection circuit and having means for indicating current flowing therein.

4. An instrument for measuring differentials in direct current flow in an incident circuit comprising a triode, the input of which is coupled to the primary circuit in such manner that a potential is applied to the grid of the triode in response to the current flow, a compensating circuit for applying a potential to the grid to compensate for that applied due to the current flow, said compensating circuit including a direct current meter which may be calibrated to read the differentials in direct current flow, a triode output circuit having a plate voltage supply, a balancing circuit which may be varied to balance the potential between a point in the balancing circuit and a point between the plate of the triode and its voltage supply, a current detection circuit connected in shunt with the points of balance, means for modulating any current flowing in the detection circuit, and a pulsating current amplifier coupled with the detection circuit and having means for indicating current flowing therein.

5. An instrument for measuring differentials in direct current flowing in an incident circuit comprising: a triode diode electronic tube; a high resistance connected in series in the primary circuit and connected in shunt with the grid and cathode of the triode, whereby a change in current flowing in the primary circuit will cause a change of potential of the grid relative to the cathode; a compensating circuit for applying a potential to the grid to compensate for the change in potential due to the change in current flowing in the primary circuit, said compensating circuit having a compensating circuit resistance connected in series in the shunt connection between the high resistance and the cathode, and having a direct potential source, a direct current meter and a variable resistance, all connected in series and the whole connected in shunt with the compensating circuit resistance, the polarity of the direct current source being such that the flow of current in the compensating circuit through the compensating resistance results in a potential difference counteracting that due to the change in current flowing in the primary circuit and the current meter will indicate a change which bears a straight line relationship to the change of current in the primary circuit; a triode output circuit having a plate voltage supply and a triode plate resistance connected in series between the plate voltage supply and the triode plate; a diode output circuit having a variable diode plate resistance connected in series between the plate voltage supply and the diode plate and having a fixed diode plate resistance connected between the arm of the variable diode plate resistance and the plate voltage supply, whereby for any flow of current in the triode output circuit the variable diode plate resistance may be adjusted to balance the potential between the triode plate and the arm of the variable diode plate resistance; a current detection circuit having a modulator connected in shunt with the triode plate and the arm of the variable diode plate resistance for modulating any current flowing in the current detection circuit due to the difference of potential between the points of balance; and a pulsating current amplifier coupled with the current detection circuit for indicating current flowing therein.

6. In a direct current measuring instrument, a triode, a triode output circuit having a plate voltage supply, a balancing circuit which may be varied to balance the potential between a point in the balancing circuit and a point between the plate of the triode and its voltage supply for any given flow of current in the output circuit, a detection circuit connected in shunt circuit with the points of balance, whereby current flows in the detection circuit if the points of connection are out of balance, means for modulating any current flowing in the detection circuit, and a pulsating current amplifier coupled with the detection circuit and having means for indicating current flowing therein.

7. In a direct current measuring instrument, a first electronic device having at least a grid, a plate, and a cathode, a first output circuit having a resistance and a plate voltage supply in series with the plate and the cathode, a second electronic device having at least a plate and a cathode, a second output circuit having a second resistance and a plate voltage supply in series with the plate and cathode of the second device, at least one of said resistances being variable, whereby upon adjustment of said variable resistance equal potential may be established between selected points in the output circuits for any flow of current in the output circuit of the first device, a detection circuit having a modulator connected in shunt with the selected points for modulating any current flowing in the detection circuit due to variation in potential between the selected points, and a pulsating current amplifier coupled with the current detection circuit for indicating current flowing therein.

8. In an electronic device, a triode, means for variably biasing the grid of the triode, a triode output circuit having a plate voltage supply, a balancing circuit which may be varied to balance the potential between a point in the balancing circuit and a point between the plate of the triode and its voltage supply, a current detection circuit connected in shunt with the points of balance, a pulsating current amplifier coupled with the detection circuit and having means for indicating current flowing therein, and means for establishing a predetermined potential to bias the grid of the triode independently of any part of the circuit, whereby, when so biased, the grid will operate at the predetermined potential and the balancing circuit can be adjusted to establish equal potential at the points of balance, and, when the predetermined potential is removed and the grid connected in the circuit, the grid bias can be adjusted to the predetermined potential by adjustment of the variable biasing means until the points of balance are again equalized.

9. In an electronic device, a triode, means for variably biasing the grid of the triode, a triode output circuit having a plate voltage supply, a balancing circuit which may be varied to balance the potential between a point in the balancing circuit and a point between the plate of the triode and its voltage supply, a current detection circuit connected in shunt with the points of balance, means for modulating any current flowing in the detection circuit, a pulsating current amplifier coupled with the detection circuit and having means for indicating current flowing therein, and means for disconnecting the grid of the triode from any part of the circuit, whereby, when so disconnected, the grid will operate at its floating grid potential and the balancing circuit can be adjusted to establish equal potential at the points of balance, and when the grid is thereafter connected, the grid bias can be adjusted to the floating grid potential by adjustment of the variable biasing means until the points of balance are again equalized.

JOHN B. WILKIE.